US008354827B2

(12) United States Patent
Werle et al.

(10) Patent No.: US 8,354,827 B2
(45) Date of Patent: Jan. 15, 2013

(54) CONTROLLER FOR A BUCK-BOOST CIRCUIT

(75) Inventors: Paul Werle, Newbury, OH (US); Todd E Kooken, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 250 days.

(21) Appl. No.: 12/477,511

(22) Filed: Jun. 3, 2009

(65) Prior Publication Data

US 2010/0308782 A1 Dec. 9, 2010

(51) Int. Cl.
*G05F 1/613* (2006.01)
*G05F 3/16* (2006.01)
*G05F 1/24* (2006.01)

(52) U.S. Cl. ........................................ 323/259; 323/224
(58) Field of Classification Search ................ 363/79, 363/81, 87, 89; 323/224, 259
See application file for complete search history.

(56) References Cited

U.S. PATENT DOCUMENTS

| 5,402,060 | A | 3/1995 | Erisman |
| 5,602,463 | A | 2/1997 | Bendall et al. |
| 5,757,634 | A | 5/1998 | Ferens |
| 6,992,469 | B1 | 1/2006 | King |
| 7,863,872 | B2* | 1/2011 | Chiu ............................ 323/271 |
| 7,994,762 | B2* | 8/2011 | De Cremoux et al. ........ 323/271 |
| 8,018,212 | B1* | 9/2011 | Petricek ........................ 323/259 |
| 2006/0274559 | A1 | 12/2006 | Saeueng et al. |
| 2006/0284606 | A1* | 12/2006 | Chen et al. .................... 323/259 |
| 2007/0273340 | A1* | 11/2007 | Miller et al. .................. 323/224 |
| 2007/0273341 | A1* | 11/2007 | Shimizu ........................ 323/224 |
| 2008/0007232 | A1* | 1/2008 | Nitta et al. .................... 323/259 |
| 2008/0164859 | A1 | 7/2008 | Peng et al. |
| 2009/0003021 | A1* | 1/2009 | Tsukamoto ..................... 363/74 |
| 2009/0039852 | A1 | 2/2009 | Fishelov et al. |
| 2009/0045786 | A1* | 2/2009 | Krellner et al. ............... 323/259 |
| 2010/0148739 | A1* | 6/2010 | Khaligh et al. ............... 323/283 |
| 2010/0309697 | A1 | 12/2010 | Werle et al. |

FOREIGN PATENT DOCUMENTS

| EP | 0 735 656 | 10/1996 |
| WO | WO 89/11691 | 11/1989 |
| WO | WO 98/09368 | 3/1998 |
| WO | WO/2010/140050 | 12/2010 |

OTHER PUBLICATIONS

Viswanathan et al., Dual-Mode Control of Cascade Buck-Boost PFC Converter, 2004, IEEE, 2004 35 th Annual PESC, 2178-2184.*
Y.M. Jiang and F.C. Lee "A New Control Scheme for Buck+Boost Power Factor Correction Circuit"; Proceedings of the Virginia Power Electronics Seminar; Sep. 19-21, 1993; pp. 189-193.
Ray Ridley, Siegfried Kern and Berthold Fuld, "Analysis and Design of a Wide Input Range Power Factor Correction Circuit for Three-Phase Applications"; IEEE 1993; pp. 299-305.

(Continued)

*Primary Examiner* — Jue Zhang
(74) *Attorney, Agent, or Firm* — Perkins Coie LLP

(57) ABSTRACT

A control circuit includes a controller that provides a master PWM signal indicative of a difference between a predetermined setpoint and a process signal. The control circuit also includes a PWM splitter circuit that receives the master PWM signal and provides a first PWM signal for a first switch and a second PWM signal for a second switch. The first PWM signal corresponds to a first portion of the master PWM signal and the second PWM signal corresponds to a second portion of the master PWM signal.

18 Claims, 4 Drawing Sheets

OTHER PUBLICATIONS

Kevin Covi, "A Combined Buck and Boost Converter for Single-Phase Power Factor Correction", 2005 IBM Power and Cooling Technology Symposium, Oct. 7, 2005.

Intl. Preliminary Report on Patentability for counterpart Intl. App. PCT/IB2010/001323 (WO2010/140050); 5 pgs,; Aug. 24, 2011).

Written Opinion for Intl. App. PCT/IB2010/001323 (WO2010/140050); 4 pgs.; (posted Dec. 3, 2011 at <http://www.wipo.int/pctdb/en/wo.jsp?WO=2010140050> accessed Jan. 24, 2011).

ISR for counterpart Intl. App. PCT/IB2010/001323 (WO2010/140050); 4 pgs.; Mar. 7, 2011).

\* cited by examiner

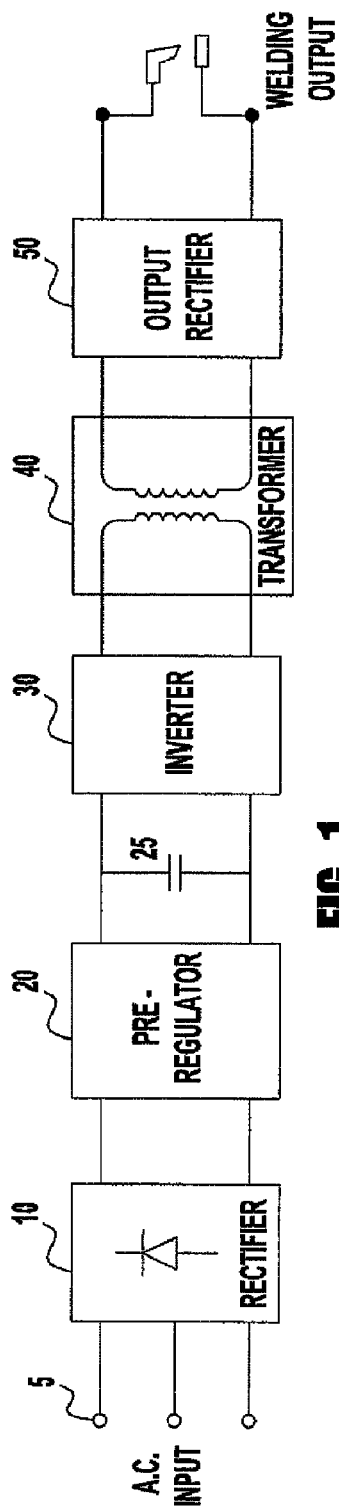
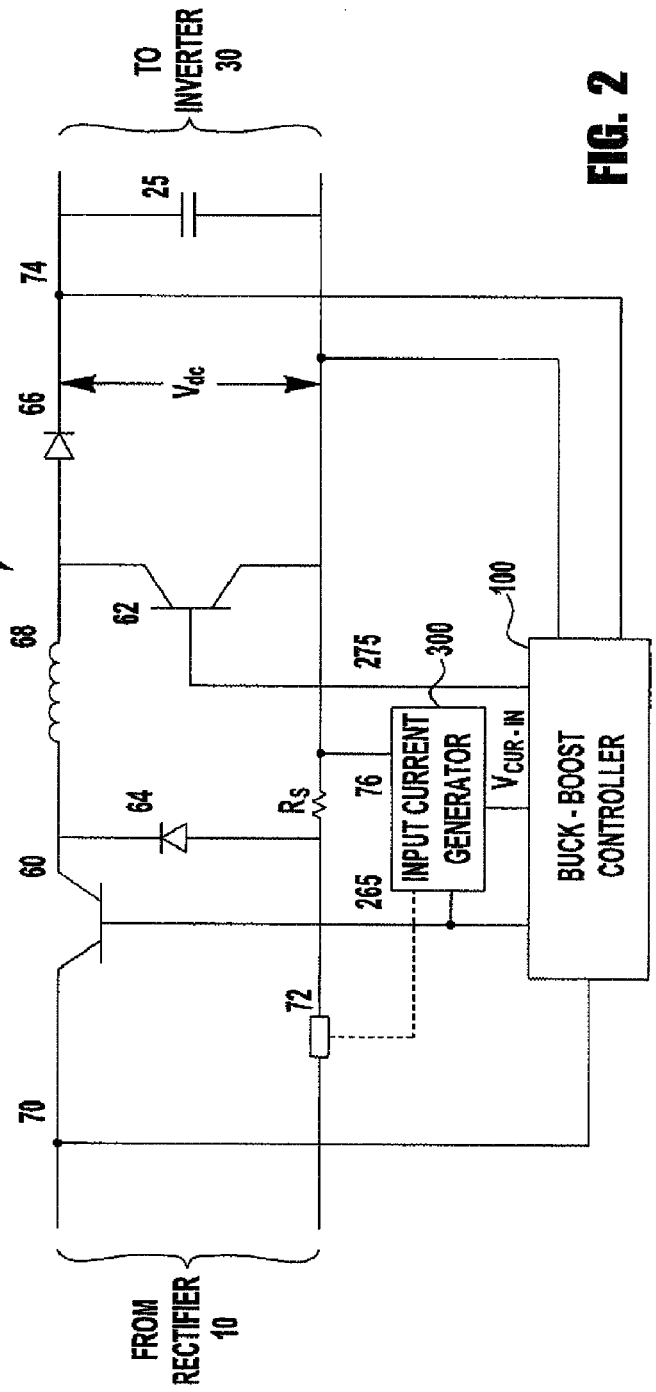
FIG. 1
FIG. 2

CONTROLLER FOR A BUCK-BOOST CIRCUIT

BACKGROUND OF THE INVENTION

This invention relates to control of pre-regulators in inverter-type power supplies and, more particularly, to a buck-boost controller in a pre-regulator of an inverter-type power supply.

In inverter-type power supplies, the input voltage is first rectified and then subjected to high frequency switching in an inverter section. The output of the inverter section is transformed to a desired voltage via a transformer and rectifier. The high frequency switching in the inverter section allows for increased efficiency and the volume and weight of the transformer can be considerably reduced.

Typically, it is desirable from a design standpoint to maintain the voltage at the input to the inverter section at a relatively constant voltage. Therefore, in order to operate the welder at a range of input voltages (e.g., 230 V to 575 V), a pre-regulator section may be added before the inverter section of the welding power supply. The pre-regulator is controlled such that the input voltage to the inverter section is maintained at a fixed voltage.

SUMMARY OF THE INVENTION

In an exemplary embodiment of the invention, a control circuit includes a controller that provides a master pulse-width-modulated signal indicative of a difference between a predetermined setpoint and a process feedback, and a PWM splitter to receive the master pulse-width-modulated signal and provide a first pulse-width-modulated signal to control a first switch and a second pulse-width-modulated signal to control a second switch. The first pulse-width-modulated signal corresponds to a first portion of the master pulse-width-modulated signal and the second pulse-width-modulated signal corresponds to a second portion of the master pulse-width-modulated signal.

BRIEF DESCRIPTION OF THE DRAWINGS

The advantages, nature and various additional features of the invention will appear more fully upon consideration of the illustrative embodiment of the invention which is schematically set forth in the figures, in which:

FIG. 1 illustrates a block diagram of a power supply consistent with an exemplary embodiment of the present invention.

FIG. 2 illustrates an exemplary embodiment of the buck-boost circuit of the pre-regulator in the power supply shown in FIG. 1.

DETAILED DESCRIPTION OF THE INVENTION

Figure 3:
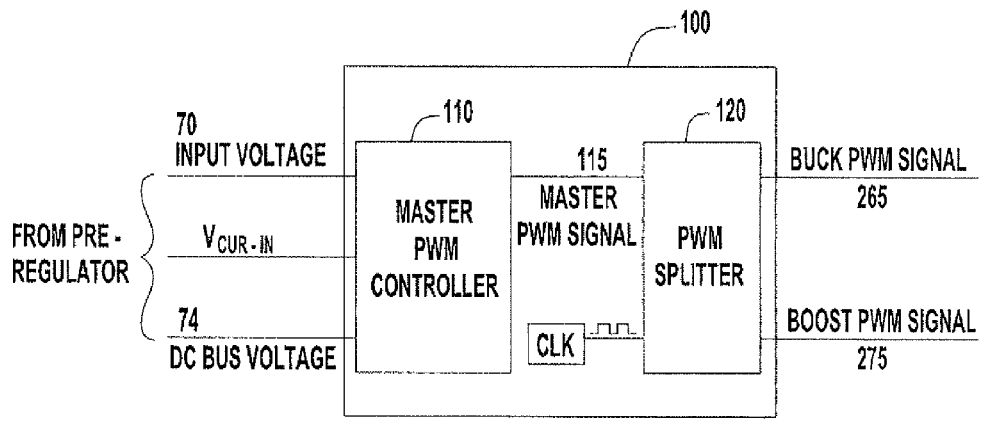
FIG. 3 is a block diagram of the exemplary buck-boost controller shown in FIG. 2.

The present invention will be explained in further detail by making reference to the accompanying drawings, which do not limit the scope of the invention in any way.

FIG. 1 illustrates an exemplary embodiment of the present invention as applied to a three-phase power supply. However, exemplary embodiments of the present invention also include single-phase power supplies. Input terminals 5 receive a range of input voltages, e.g., from 115 volts rms to 575 volts rms. The input power signal is rectified by rectifier 10, which, in this illustrative embodiment, comprises a diode-bridge. The rectified output is then sent to pre-regulator 20.

Pre-regulator 20 is configured to provide a relatively constant pre-set voltage Vdc at the input of inverter 30 for the various input voltages. In this non-limiting exemplary embodiment, the output of the pre-regulator Vdc is set at 400 volts dc. A capacitor 25 may be used to store energy such that power flow to inverter 30 is un-interrupted as load varies. In the embodiment shown, the inverter 30 is a high-frequency switching circuit that converts the dc signal at its input to an ac signal.

The output of inverter 30 is converted by transformer 40 and output rectifier 50 to an appropriate voltage for the desired application. As an example, FIG. 1 shows an application where the power supply is used as a dc welder.

As shown in FIG. 2, in an exemplary embodiment of the present invention the pre-regulator 20 may be configured as a buck-boost circuit. Pre-regulator 20 includes a buck switch 60, a boost switch 62, diodes 64 and 66 and an inductor 68. The buck switch 60 and the boost switch 62 may be a solid-state switch such as, for example, an IGBT or a MOSFET, and these switches are controlled by buck-boost controller 100 in order to maintain the output of pre-regulator 20, Vdc, at a desired setpoint. In a non-limiting embodiment, this setpoint for Vdc can be 400 volts dc. In other exemplary embodiments, the setpoint Vdc can be set higher or lower based on operational or desired parameters.

Buck-boost controller 100 receives an integrated signal Vcur-in representing the average input current to the welder from input current generator 300. Because the input current to the welder pulsates when the pre-regulator 20 is operating in buck mode, the buck-boost controller 100 can experience instability due to sub-harmonic oscillations if the input current is used directly. To prevent this instability, an integrated signal Vcur-in representing the input current is generated by input current generator 300. The input current generator 300 may use a related art configuration that uses a signal from the input current sensor 72 (shown with a dotted line). Preferably, the input current signal is synthesized using inductor current signal 76 prior to being integrated. Applicant's co-pending application filed on the same day as the present application and titled "Input Current Generating Scheme For Buck-Boost Controller" discloses an embodiment of input current generator 300 that synthesizes an input current signal using the inductor current and integrates the synthesized signal to generate the average input current to the welder. The entirety of Applicant's co-pending application, "Input Current Generating Scheme For Buck-Boost Controller," is incorporated herein by reference.

Figure 4:
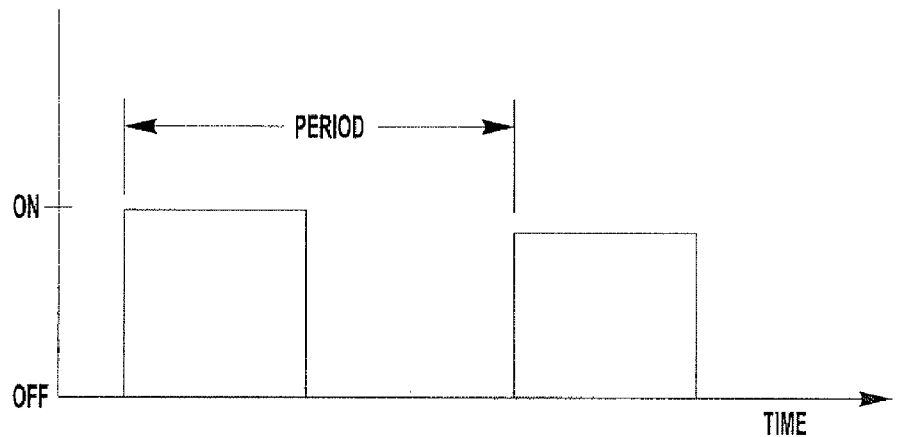
FIG. 4 illustrates an exemplary PWM signal.

Buck-boost controller 100 outputs a buck PWM signal 265 and a boost PWM signal 275 that are sent to buck switch 60 and boost switch 62, respectively. These PWM signals, as the name implies, are pulse-width-modulated signals as illustrated in FIG. 4. A ratio of the ON time of these PWM signals to the period represents the duty-cycle of the PWM signal. A duty-cycle of 0% indicated that the PWM signal is OFF all the time, and duty-cycle of 100% indicates that the PWM signal is ON all the time.

As shown in FIG. 3, Buck-boost controller 100 comprises master PWM controller 110 and PWM-splitting circuit 120. Master PWM controller 110 may be any standard, commercially available controller that provides a PWM signal. For example, in the illustrative exemplary embodiment, it is a boost-type power factor correction (PFC) controller. Master PWM controller 110 outputs a master PWM signal 115 that controls pre-regulator 20 such that its output voltage, Vdc, is at the desired setpoint. If controller 110 is also configured to perform PFC (as in the illustrative embodiment), then master PWM signal 115 will also control pre-regulator 20 such that the input current waveform matches the input voltage waveform.

Figure 5:
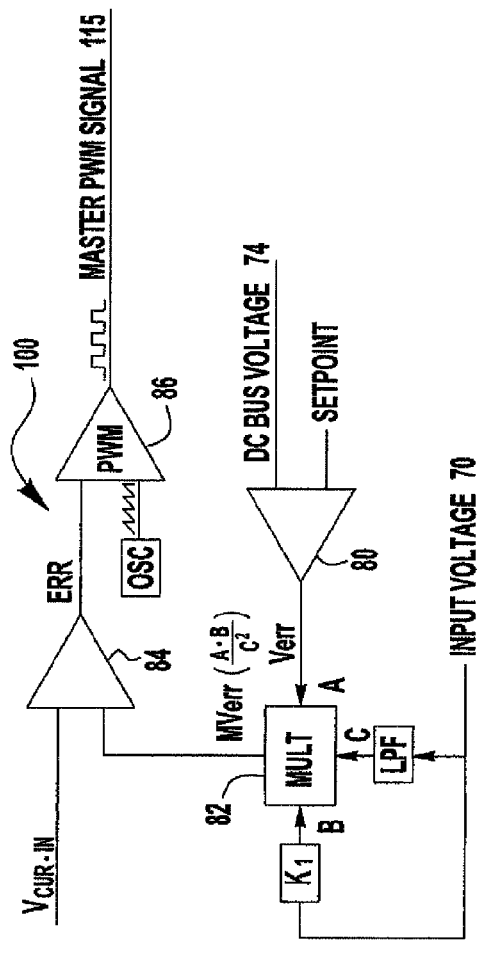
FIG. 5 is a circuit block diagram of the master PWM controller shown in FIG. 3.

To provide PFC control, master PWM controller 110 receives input voltage signal 70, dc bus voltage signal 74 (i.e., Vdc) and Vcur-in as shown in FIG. 5. DC bus voltage signal 74 is sent to comparator 80 whose other input is a reference voltage corresponding to the desired setpoint. The output of comparator 80 is an error signal, Verr, corresponding to the deviation from setpoint of Vdc. The error signal, Verr, is one input (input A) to multiplier 82. Multiplier 82 then modifies the error signal, Verr, using input voltage signal 70. In the illustrative embodiment, multiplier 82 receives a sinusoidal reference signal (input B) and a feedforward signal (input C) based on the input voltage signal 70, and outputs a modified error signal, MVerr, that is one input to current amplifier 84. In the illustrative embodiment, the modified error signal, MVerr, equals $A*B/C^2$. The other input to current amplifier 84 is Vcur-in. The current amplifier 84 acts as a standard amplifier and outputs a signal, ERR, that is proportional to the difference between the two inputs. The output of current amplifier 84 is compared to a "saw-tooth" wave signal from an oscillator by PWM comparator 86. The output of PWM comparator 86 is master PWM signal 115, which is a square wave whose duty-cycle is proportional to the output of current amplifier 84. The operation of master PWM controller 110 is well known in the art and will not be discussed further.

Because the signal from master PWM controller 110 must be used to control both buck switch 60 and boost switch 62, master PWM signal 115 must be split into two control ranges, one range for each switch. In an exemplary embodiment, the master PWM signal 115 range is split equally, i.e. one switch is operated from 0 to 50% duty-cycle on master PWM signal 115 and the second switch is operated from 50% to 100% duty cycle. In the illustrative, non-limiting embodiment, 0 to 50% duty-cycle on master PWM signal 115 is used to control buck switch 60 and 50 to 100% duty-cycle is used to control boost switch 62.

However, in an embodiment, buck switch 60 and boost switch 62 will each receive a 0 to 100% PWM signal. In this embodiment, 0-50% on master PWM signal 115 must be converted to a 0 to 100% PWM signal for buck switch 60. Similarly, 50 to 100% on master PWM signal 115 must be converted to a 0 to 100% PWM signal for boost switch 62. To perform this conversion, master PWM controller 110 sends master PWM signal 115 to PWM splitter 120.

Figure 6:
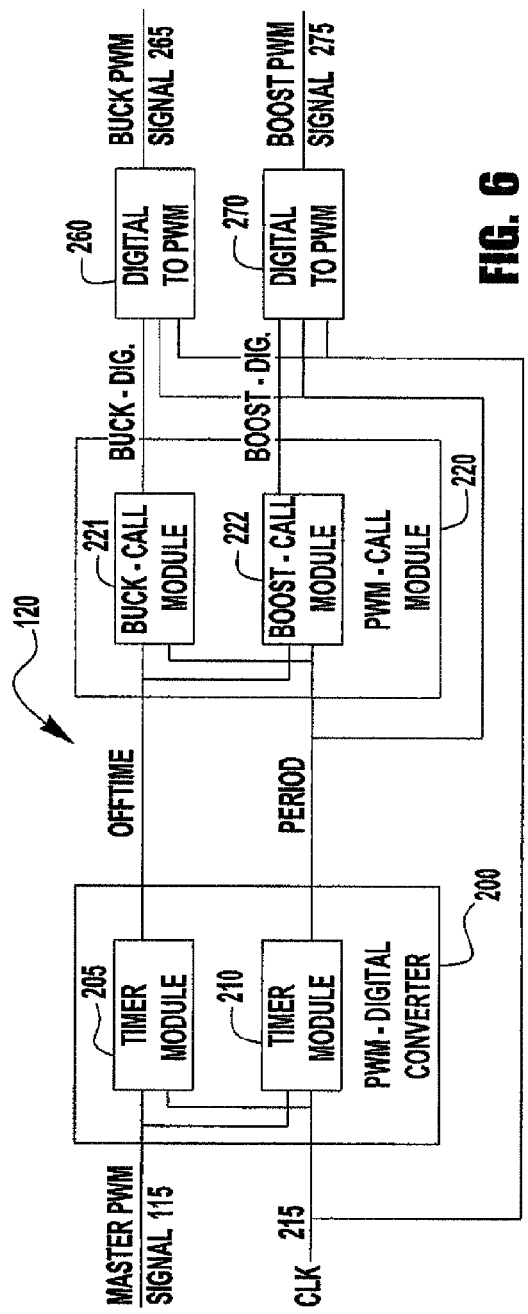
FIG. 6 is a block diagram of the PWM splitter shown in FIG. 3.

As shown in FIG. 6, PWM splitter 120 includes algorithms that split master PWM signal 115 into buck PWM signal 265 and boost PWM signal 270, which respectively control buck switch 60 and boost switch 62. PWM splitter 120 includes a PWM-digital converter 200, a PWM calculation module 220 and digital-PWM converters 260 and 270.

PWM-digital converter 200 receives master PWM signal 115 and converts it into two digital values. One value (PERIOD) represents the period of PWM signal 115 and the other value (OFFTIME) represents the amount of time the PWM signal is at a value of zero. PWM-digital converter 200 comprises timer modules 205 and 210 to perform the conversion from a PWM signal to a digital value.

Timer module 210 inputs master PWM signal 115 and clock signal 215. Timer module 210 measures the period of master PWM signal 115 by counting the number of pulses from clock signal 215 for one cycle of master PWM signal 115, and the measured value is output as PERIOD. For example, timer module 210 may count the number of pulses from one rising edge of master PWM signal 115 to the next rising edge. The frequency of clock signal 115 is set much greater than that of the PWM signal 115 in order to provide an accurate value for PERIOD.

Similarly, timer module 205 inputs master PWM signal 115 and clock signal 215. However, instead of counting the period, timer module 205 counts clock pulses during the time the PWM signal is at a value of zero for one period of the PWM signal. This digital value is output as OFFTIME.

OFFTIME and PERIOD are received by PWM-calc module 220, which generates a digital control value (BUCK-DIG) for buck switch 60 and a digital control value (BOOST-DIG) for the boost switch 62. Specifically, PWM-calc module 220 includes buck-calc module 221 and boost-calc module 222. Buck-calc module 221 receives digital values PERIOD and OFFTIME and outputs digital control value BUCK-DIG using the following algorithm:

If OFFTIME > (PERIOD / 2),
    then BUCK-DIG = (PERIOD− OFFTIME) × 2,
    else BUCK-DIG = PERIOD.

Boost-calc module 222 receives digital values PERIOD and OFFTIME and outputs digital control value BOOST-DIG using the following algorithm:

If OFFTIME < (PERIOD / 2),
    then BOOST-DIG = ((PERIOD / 2) − OFFTIME) × 2,
    else BOOST-DIG = 0.

Digital-PWM module 260 receives the BUCK-DIG value, the PERIOD value and clock signal 215 and outputs buck PWM signal 265. Similarly, digital-PWM module 270 receives the BOOST-DIG value, the PERIOD value and clock signal 215 and outputs boost PWM signal 275. Buck PWM signal 265 and Boost PWM signal 275 respectively control buck switch 60 and boost switch 62.

PWM splitter 120 discussed above may be implemented in a wide variety of digital devices, e.g., microcontrollers, programmable logic controllers, etc.). Accordingly, there is flexibility in choosing the device that is most economical. PWM splitter 120 can also be used with a wide variety of controllers that outputs a PWM signal, e.g., a buck-type PFC controller, a boost-type PFC controller, a simple buck controller, a simple boost controller, etc. Because the PWM signal splitting is implemented using algorithms in a digital controller, the inherent calibration errors of the prior art analog circuitry are not present.

Figure 7:
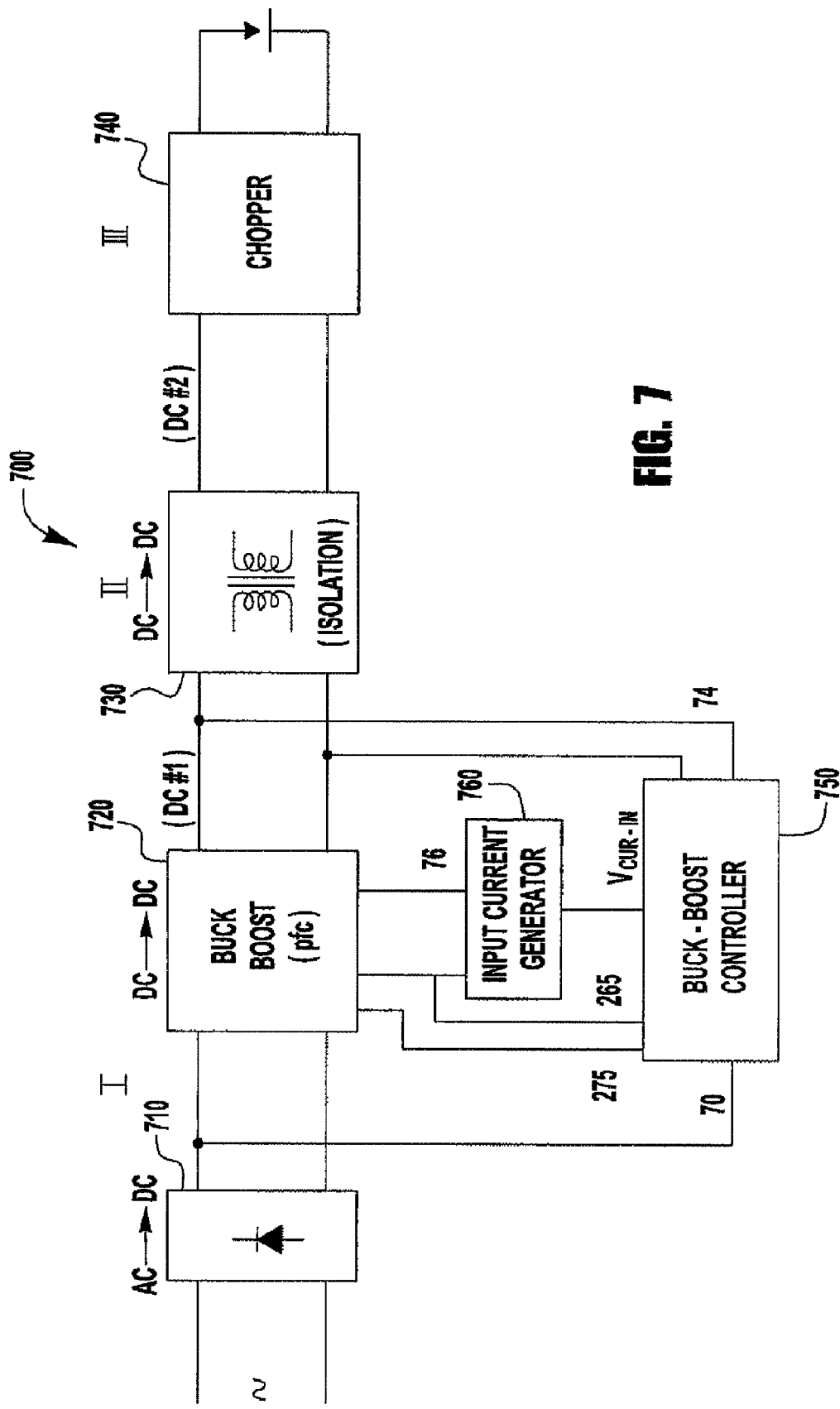
FIG. 7 illustrates a three-stage power supply using a buck-boost controller that is consistent with the present invention.

The above exemplary embodiment is discussed using a two-stage power supply topology. However, consistent with the present invention, other power supply topologies may also be used. For example, FIG. 7 shows a power supply 700 configured as a three-stage power supply. Stage I of power supply comprises a rectifier 710 and a pre-regulator 720, which is a buck-boost type DC-DC converter. Pre-regulator 720 may optionally perform power factor correction. Stage II of power supply 700 is an isolated DC-DC converter 730 that converts the voltage on bus DC #1 to a voltage appropriate for Stage III (DC #2). The DC-DC converter 730 typically comprises an inverter, high-frequency transformer and rectifier circuit to perform the voltage conversion. Stage III may be a chopper circuit (chopper 740) that provides the appropriate waveforms used in welding. In FIG. 7, DC-DC converter 720 is controlled by a buck-boost controller 750 that uses input current generator 760. The respective configurations of buck-boost controller 750 and input current generator 760 are consistent with the present invention as discussed above.

While the invention has been described in terms of various specific embodiments, those skilled in the art will recognize that the invention can be practiced with modification within the spirit and scope of the claims.

What is claimed is:

1. A control circuit, comprising:
   a controller providing a master pulse-width-modulated signal indicative of a difference between a predetermined setpoint and a process feedback;
   a clock providing a clock signal; and
   a PWM splitter to receive the master pulse-width-modulated signal and the clock signal to provide a first pulse-width-modulated signal to control a first switch and a second pulse-width-modulated signal to control a second switch, the PWM splitter including:
      a PWM-to-digital converter to provide a first digital signal and a second digital signal, the first digital signal being a period of the master pulse-width-modulated signal and the second digital signal being a time at which the master pulse-width-modulated signal is zero;
      a control module to receive the first and second digital signals to provide a digital buck control signal and a digital boost control signal,
      wherein if the second digital signal is greater than first digital signal divided by 2, then the digital buck control signal is two times the first digital signal minus the second digital signal, otherwise the digital buck control signal is equal to the first digital signal,
      wherein if the second digital signal is less than the first digital signal divided by 2, then the digital boost control signal is two times the first digital signal divided by two minus the second digital signal, otherwise the digital boost control signal is equal to zero,
      a first digital-to-PWM module to receive the digital buck control signal, the first and second digital signals to provide the first pulse-width-modulated signal; and
      a second digital-to-PWM module to receive the digital boost control signal, the first and second digital signals to provide the second pulse-width-modulated signal.

2. The control circuit of claim 1, wherein the first switch is buck switch in a buck-boost circuit and the second switch is a boost switch in the buck-boost circuit.

3. The control circuit of claim 1, wherein the controller comprises a power factor correction circuit and the master pulse-width-modulation signal provides power factor correction.

4. The control circuit of claim 2, wherein the PWM splitter comprises a first module to convert the first portion of the pulse-width-modulated signal to a 0 to 100% duty-cycle signal that corresponds to the first pulse-width-modulated signal, and is second module to convert the second portion of the pulse-width-modulated signal to a 0 to 100% duty-cycle signal that corresponds to the second pulse-width-modulated signal.

5. The control circuit of claim 4, wherein the first portion corresponds to 0 to 50% of the master pulse-width-modulated signal and the second portion corresponds to 50 to 100% of the master pulse-width-modulated signal.

6. The control circuit of claim 1, wherein the controller comprises a boost circuit.

7. The control circuit of claim 1, wherein the controller comprises a buck circuit.

8. A power supply, comprising:
   an input rectifier to convert an ac input signal to a rectified dc signal;
   a pre-regulator to convert the rectified dc signal to a dc bus signal having a voltage magnitude based on a predetermined setpoint, the pre-regulator comprising a buck switch and a boost switch;
   an output circuit that converts the dc bus signal to an output signal; and
   a control circuit to control the pre-regulator, the control circuit comprising,
   a controller providing a master pulse-width-modulated signal indicative of a difference between the predetermined setpoint and the dc bus signal;
   a clock providing a clock signal; and
   a PWM splitter to receive the master pulse-width-modulated signal and the clock signal to provide a first pulse-width-modulated signal and a second pulse-width-modulated signal, the PWM splitter including:
      a PWM-to-digital converter to provide a first digital signal and a second digital signal, the first digital signal being a period of the master pulse-width-modulated signal and the second digital signal being a time at which the master pulse-width-modulated signal is zero;
      a control module to receive the first and second digital signals to provide a digital buck control signal and a digital boost control signal,
      wherein if the second digital signal is greater than first digital signal divided by 2, then the digital buck control signal is two times the first digital signal minus the second digital signal, otherwise the digital buck control signal is equal to the first digital signal,
      wherein if the second digital signal is less than the first digital signal divided by 2, then the digital boost control signal is two times the first digital signal divided by two minus the second digital signal, otherwise the digital boost control signal is equal to zero,
      a first digital-to-PWM module to receive the digital buck control signal, the first and second digital signals to provide the first pulse-width-modulated signal; and
      a second digital-to-PWM module to receive the digital boost control signal, the first and second digital signals to provide the second pulse-width-modulated signal.

9. The power supply of claim 8, wherein the first pulse-width-modulated signal controls the buck switch and the second pulse-width-modulated signal controls the boost switch.

10. The power supply of claim 8, wherein the controller comprises a power factor correction circuit and the master pulse-width-modulation signal provides power factor correction.

11. The power supply of claim 9, wherein the PWM splitter comprises a first module to convert the first portion of the pulse-width-modulated signal to a 0 to 100% duty-cycle signal that corresponds to the first pulse-width-modulated signal, and a second module to convert the second portion of the pulse-width-modulated signal to a 0 to 100% duty-cycle signal that corresponds to the second pulse-width-modulated signal.

12. The power supply of claim 11, wherein the first portion corresponds to 0 to 50% of the master pulse-width-modulated signal and the second portion corresponds to 50 to 100% of the master pulse-width-modulated signal.

13. The power supply of claim 8, wherein the controller comprises a boost circuit.

14. The power supply of claim 8, wherein the controller comprises a buck circuit.

15. A method of controlling a buck-boost circuit, the method comprising:
  providing a master pulse-width-modulated signal; and
  splitting the master pulse-width-modulated signal to provide a buck pulse-width-modulated signal to control a buck switch and a boost pulse-width-modulated signal to control a boost switch, the splitting including:
    converting the master pulse-width-modulated signal to a first digital signal and a second digital signal, the first digital signal being a period of the master pulse-width-modulated signal and the second digital signal being a time at which the master pulse-width-modulated signal is zero;
  providing a digital buck control signal and a digital boost control signal,
    wherein if the second digital signal is greater than first digital signal divided by 2, then the digital buck control signal is two times the first digital signal minus the second digital signal, otherwise the digital buck control signal is equal to the first digital signal,
    wherein if the second digital signal is less than the first digital signal divided by 2, then the digital boost control signal is two times the first digital signal divided by two minus the second digital signal, otherwise the digital boost control signal is equal to zero,
    a first digital-to-PWM module to receive the digital buck control signal, the first and second digital signals to provide the first pulse-width-modulated signal; and
    a second digital-to-PWM module to receive the digital boost control signal, the first and second digital signals to provide the second pulse-width-modulated signal.

16. The method of claim 15, further comprising providing power factor correction.

17. The method of claim 15, further comprising:
  converting the first portion of the master pulse-width-modulated signal to a 0 to 100 duty-cycle signal that corresponds to the buck pulse-width-modulated signal; and
  converting the second portion of the master pulse-width-modulated signal to a 0 to 100% duty-cycle signal that corresponds to the boost pulse-width-modulated signal.

18. The method of claim 17, wherein the first portion corresponds to 0 to 50% of the master pulse-width-modulated signal and the second portion corresponds to 50 to 100% of the master pulse-width-modulated signal.

* * * * *